US005326624A

United States Patent [19]

Tsubaki et al.

[11] Patent Number: 5,326,624

[45] Date of Patent: Jul. 5, 1994

[54] PHOTOGRAPHIC SUPPORT

[75] Inventors: Masayuki Tsubaki; Touru Noda, both of Tokyo; Nobushige Ikeya; Takuya Seri, both of Kurashiki, all of Japan

[73] Assignees: Mitsubishi Paper Mills Limited; Mitsubishi Kasei Corporation, both of Tokyo, Japan

[21] Appl. No.: 911,047

[22] Filed: Jul. 9, 1992

[30] Foreign Application Priority Data

Sep. 9, 1991 [JP] Japan .................................. 3-228103

[51] Int. Cl.[5] .......................... B32B 27/10; G03C 1/86

[52] U.S. Cl. .................................... 428/213; 428/218; 428/511; 428/513; 428/516; 428/327; 428/330; 430/534; 430/538

[58] Field of Search ............... 428/513, 511, 516, 213, 428/218, 327, 330; 430/534, 538, 536

[56] References Cited

FOREIGN PATENT DOCUMENTS 1447815 3/1969 Fed. Rep. of Germany .
3244319 6/1983 Fed. Rep. of Germany .
3627859 2/1988 Fed. Rep. of Germany .

*Primary Examiner*—P. C. Sluby
*Attorney, Agent, or Firm*—Cushman, Darby & Cushman

[57] ABSTRACT

A photographic support comprising a paper substrate and the resin layers formed on both sides thereof, each of the resin layers being made of a resin composition comprising a polyethylene resin, wherein the difference in thickness between the resin layer on the side on which a photographic layer is to be provided and the resin layer on the opposite side is 3 μm or greater, and the polyethylene resin in the resin layer on the side opposite from the photographic layer is a compounded resin prepared by melting and mixing a specified number of parts by weight of a specific low-density or medium-density polyethylene resin and a specified number of parts by weight of a specific high-density polyethylene resin. This resin-coated paper type photographic support has good adhesion between the base paper and the resin layer on the side opposite from the photographic layer, excellent in qualities such as anticurl properties, cutting properties and capable of high-speed production.

7 Claims, No Drawings

PHOTOGRAPHIC SUPPORT

This invention relates to a resin-coated paper type photographic support comprising a paper substrate (hereinafter referred to as base paper) coated on its both sides with a resin composition mainly composed of a polyethylene based resin. More particularly the invention pertains to said resin-coated paper type photographic support which has good adhesion between base paper and resin layer on the side opposite from a photographic layer, possesses excellent qualities such as anticurl properties and can be produced at a high speed.

Resin-coated paper type photographic supports in which at least one side of the substrate is coated with a resin having film-forming properties are well known in the art. For example, Japanese Patent Application Kokoku No. 55-12584 discloses the techniques relating to a photographic support having its base paper coated with a resin having film-forming properties, preferably a polyolefin resin. Also, U.S. Pat. No. 3,501,298 discloses a contrivance regarding a photographic support in which both sides of a base paper are coated with a polyolefin resin. Since introduction of the rapid photographic development processing system for the sensitive materials using a silver halide, the photographic support having its base paper coated on both sides thereof with a polyethylene resin has been popularly used as photographic printing paper, and optionally a titanium dioxide pigment is contained in the resin layer on the film-formed side of the support for affording sharpness to the image.

There are also known resin-coated paper type photographic supports in which a resin layer comprising a resin composition mainly composed of a low-density polyethylene resin and a high-density polyethylene resin is provided on the side of the base paper opposite from the photographic layer. For example, Japanese Patent Application Kokoku No. 44-22904 discloses a photographic support having its base paper coated with a polyethylene composition comprising 15–65% by weight of a specific low-density polyethylene resin having a density of 0.915–0.926 g/cm$^3$ and a melt-index of 2.9–16 g/10 min and 85–35% by weight of a specific high-density polyethylene resin having a density of 0.960–0.975 g/cm$^3$ and a melt index of 5–18 g/10 min, said polyethylene composition being capable of rapid coating and proof against neck-in and pinholing. Also, Japanese Patent Application Kokoku No. 48-9963 discloses a photographic support having its base paper coated with a resin composition comprising a 1:1 mixture of a low-density polyethylene resin and a high-density polyethylene resin, said support having good anticurl properties. Further, Japanese Patent Application Kokai No. 58-95732 discloses a photographic support having its base paper coated with a polyethylene resin composition composed of 40–75 parts by weight of a high-density polyethylene resin having a density of 0.945 g/cm$^3$ or above and a melt index of 15–40 g/10 min and 60–25 parts by weight of a low-density polyethylene resin having a density of 0.930 g/cm$^3$ or below and a melt index of 1–40 g/10 min, said support having good cutting qualities and anticurl properties.

It was found, however, that even when using a resin composition composed of a low-density polyethylene resin and a high-density polyethylene resin such as disclosed in the above-mentioned patents, a serious problem arises in case of high-speed production of resin-coated paper type photographic supports using base paper as substrate. That is, in fabrication of a resin-coated paper type photographic support according to a melt-extrusion coating method in which the moving base paper is coated with a molten resin composition, when such fabricating operation is carried out at a base paper moving speed higher than 100 m/min, especially higher than 140 m/min, adhesion between base paper and polyethylene resin layer of the produced support would be deteriorated, giving rise to a possibility of exfoliation of the resin layers from the base paper during handling of the photographic support or a photographic material having such a support. Thus, such a photographic support causes problems in practical use.

Accordingly, the primary object of this invention is to provide a resin-coated paper type photographic support comprising a base paper as substrate, the base paper being coated on its both sides with a resin composition mainly composed of polyethylene resins, which support has good adhesion between base paper and resin layer on the side opposite from the photographic layer, possesses excellent qualities such as anti-curl properties and can be produced at a high speed. Other objects of this invention will become apparent as the invention is further described below.

As a result of the studies pursued for overcoming the above problems, the present inventors found that the objects of this invention can be attained by providing a photographic support having on both sides of its paper substrate a resin layer comprising a polyethylene based resin, wherein the difference in thickness between the resin layer on the side where the photographic layer is provided (this resin layer being hereinafter referred to as front resin layer) and the resin layer on the opposite side (this resin layer being hereinafter referred to as back resin layer) is 3 μm or greater, and the polyethylene resin in the back resin layer is a compounded resin prepared by melting and mixing 5–25 parts by weight of a low-density or medium-density polyethylene resin having a density of 0.935 g/cm$^3$ or below and a melt index as defined by JIS K6760 of 0.2–4 g/10 min and 95–75 parts by weight of a high-density polyethylene having a density of 0.950 g/cm$^3$ or above and a melt index defined by JIS K6760 of 18.5–50 g/10 min. It was further found that the object of this invention can be realized in a more notable way when at least the surface of the base paper on the side opposite from the photographic layer is treated with a copolymer having at least ethylene and acrylic (or methacrylic) acid.

As the low-density or medium-density polyethylene resin constituting the back resin layer of the photographic support according to this invention, there can be used the polyethylene resins which range widely in density, melt index, molecular weight and molecular weight distribution, either singly or in combination, provided that the density is not greater than 0.935 g/cm$^3$ and that the melt index defined by JIS K6760 (hereinafter referred to as MI) is in the range of 0.2–4 g/10 min. It is also possible to use the ordinary low-density polyethylene resins prepared by autoclave method, low-density polyethylene resins prepared by tubular method, linear low-density polyethylene resins, medium-density polyethylene resins, copolymers of ethylene and α-olefin such as propylene, butylene, etc., carboxy-modified polyethylene resins and mixtures of these resins.

As the high-density polyethylene resin forming the back resin layer of the photographic support according to this invention, there can be used the polyethylene resins of various densities, melt indices, molecular weights and molecular weight distributions, either singly or in combination, provided that the density is not smaller than 0.950 g/cm$^3$ and MI is in the range of 18.5–50 g/10 min. It is also possible to use the ordinary high-density polyethylene resins, copolymers of ethylene and α-olefins such as propylene, butylene, etc., and mixtures of these resins.

The mixing ratio, density and MI of the low-density or medium-density polyethylene resin and the high-density polyethylene resin used for constituting the back resin layer in the present invention were decided from the comprehensive viewpoint as a result of trial-and-error testing regarding miscibility and workability of the resins in the production of the photographic support, adhesion between base paper and resin composition layers of the photographic support, anticurl properties and other matters. In the present invention, the content of the high-density polyethylene resin in the resin composition consisting of a high-density polyethylene resin and a low-density or medium-density polyethylene resin is defined to be in the range of 95–75 parts by weight for the reason that if said content is less than 75 parts by weight, adhesion between base paper and resin layer and anticurl properties are deteriorated, while if said content exceeds 95 parts by weight, miscibility and workability of the resins and adhesion between base paper and resin layer are deteriorated. The especially preferred range of content of high-density polyethylene resin in said resin composition is 93–77 parts by weight. In the present invention, MI of the high-density polyethylene resin in said resin composition is in the range of 18.5–50 g/10 min due to the reason that if said MI is lower than 18.5 g/10 min, adhesion between base paper and resin layer and high-speed workability are deteriorated, while if said MI is higher than 50 g/10 min, miscibility and workability of the resins and anticurl properties of the product are deteriorated. Said MI is preferably in the range of 18.5–45 g/10 min, more preferably 20–36 g/10 min. The density of said high-density polyethylene resin is defined to be not lower than 0.950 g/cm$^3$ because otherwise anticurl properties are deteriorated. Preferably said density is not below 0.955 g/cm$^3$.

On the other hand, MI of the low-density or medium-density polyethylene resin in the back resin layer used in this invention is defined to be in the range of 0.2–4 g/10 min. This is because if said MI is lower than 0.2 g/10 min, miscibility of the resins, adhesion between base paper and resin layer and high-speed workability are deteriorated, while if said MI is higher than 4 g/10 min, high-speed workability lowers and also anticurl properties tend to deteriorate. In the present invention, MI of said low-density or medium-density polyethylene resin is preferably in the range of 0.3–3 g/10 min, more preferably 0.3–1.5 g/10 min. The density of said low-density or medium-density polyethylene resin is defined to be 0.935 g/cm$^3$ or below for the reason that if said density is higher than 0.935 g/cm$^3$, workability of the resin composition and adhesion between base paper and resin layer are deteriorated. Said density is preferably not higher than 0.930 g/cm$^3$.

The polyethylene resin used for forming the back resin layer of the photographic support of this invention is a compounded resin prepared by melting and mixing a low-density or medium-density polyethylene resin and a high-density polyethylene resin. Various methods are available for preparing such a compounded resin. In a preferred method, predetermined amounts of a low-density or medium-density polyethylene resin and a high-density polyethylene resin are melted and mixed, if necessary together with an additive or additives such as lubricant, by using an extruder for kneading, hot roll mill, Banbury mixer, press kneader or other suitable means, and the mixture is pelletized. In case the two types of polyethylene resin are not used in the form of a compounded resin but are simply mixed and directly applied to a melt extruder to be thereby subjected to melt extrusion coating, there can not be obtained good adhesion between base paper and resin layer and also miscibility and workability of the resins are deteriorated.

The other side of the base paper of the photographic support of this invention, that is, the side of the base paper where the photographic layer is provided, is coated with a resin composition comprising a polyethylene resin. As such polyethylene resin, there can be used low-density polyethylene, medium-density polyethylene, high-density polyethylene, linear low-density polyethylene, copolymers of ethylene and α-olefins such as propylene, butylene, etc., carboxy-modified polyethylene and mixtures of these polyethylenes. The polyethylenes of various densities, melt indices, molecular weights and molecular weight distributions can be used, but usually it is recommended to use the polyethylenes having a density in the range of 0.90–0.97 g/cm$^3$, an MI in the range of 1–30 g/min and a molecular weight in the range of 20,000–250,000, either singly or in combination.

As regards the thickness of the front and back resin layers of the photographic support according to this invention, such thickness is not subject to any specific restrictions other than the essential requirement that the difference between thickness of the front resin layer and that of the back resin layer should be not less than 3 μm. In the present invention, such difference is preferably in the range of 10–40 μm. If said difference is less than 3 μm, the produced photographic support or a photographic material having such support proves poor in cutting qualities. The photographic support or a photographic material having such support is cut to a desired size by a suitable cutter such as guillotine cutter or precision print cutter, but in the case of the conventional photographic supports or photographic materials having such support, there has been the problem that they might not be cut correctly and the whisker-like burrs could be left at the cut section to reduce the commercial value of the product. The photographic support according to this invention or a photographic material having such support can be cut smoothly and correctly to present a faultless cut section.

The photographic support of this invention is produced by the so-called melt extrusion coating method in which a polyethylene resin composition is cast into the form of film from a slit die of a melt extruder and coated on a moving base paper. In this operation, the molten film temperature is preferably kept at 280°–340° C. As the slit die, it is preferred to use a flat die such as T-die, L-die or fish tail die, and the slit orifice is preferably 0.1–2 mm in clearance. It is also desirable to apply an activating treatment such as corona discharge treatment, flame treatment, etc., on the base paper before coating it with the resin composition. It is also recommended to blow an ozonous gas to the molten resin composition on the side contacting the base paper and then coat the base paper with the resin layers as described in U.S. Pat. No. 4,481,289. In the present invention, the front and back resin layers are preferably coated on the base paper successively, preferably by a so-called tandem extrusion coating system according to which extrusion coating is performed continuously. The surface of the back resin layer of the photographic support may be worked into a glossy surface, a slightly rough surface as described in Japanese Patent Application Kokoku No. 62-19732, a matte surface or a silky surface, and usually it is preferably worked into a dull surface.

Various additives may be contained in the resin layers of the photographic support according to this invention. Such additives include, for example, white pigments such as titanium oxide, zinc oxide, talc, calcium carbonate, etc., fatty acid amides such as stearic acid amide, arachidic acid amide, etc., metal salts of fatty acids such as zinc stearate, calcium stearate, aluminum stearate, magnesium stearate, zinc palmitate, zinc myristate, calcium palmitate, etc. as for instance described in Japanese Patent Application Kokoku Nos. 60-3430, H1-38291 and H1-38292, Japanese Patent Application Kokai No. H1-105245 and U.S. Pat. No. 4,447,524, various phosphorus or sulfur type antioxidants such as hindered phenols, hindered amines, etc., as described in Japanese Patent Application Kokai No. H1-105245, blue pigments or dyes such as cobalt blue, ultramarine, cerulean blue, phthalocyanine blue, etc., magenta pigments or dyes such-as cobalt violet, fast violet, manganese violet, etc., fluorescent bleaches ultraviolet absorbers, etc such as disclosed in Japanese Patent Application Kokai No. H2-25440. These additives may be contained in suitable combination, preferably as a masterbatch or compound of the resins.

Regarding incorporation of the additives, it is for instance suggested to add a phenolic antioxidant in an amount of 50–500 ppm, preferably 100–500 ppm, based on the total amount of the high-density polyethylene and low-density polyethylene used for the resin composition.

As such phenolic antioxidant, the commercial products such as Irganox 1010 and 1076 (Ciba Geigy Corp.) and Topanol CA (ICI Corp. ) can be used.

When the amount of the phenolic antioxidant added is less than 50 ppm, gel is formed in the resin at the time of extruding, while addition of this antioxidant in excess of 500 ppm causes a reduction of adhesiveness of the resin layer to the base paper.

It is also advisable to add a metal salt of a fatty acid in an amount of 50–800 ppm, preferably 80–500 ppm, based on the total amount of the high-density polyethylene and the low-density polyethylene.

When the amount of said metal salt added is less than 50 ppm, the die lip tends to be contaminated at the time of extruding, while addition of this metal salt in excess of 800 ppm may cause bleeding from the film surface during extruding to contaminate the roll and product surfaces.

Calcium stearate, magnesium stearate and zinc stearate can be cited as preferred examples of the metal salts of fatty acids usable as additive in this invention.

As for the way of addition of said phenolic antioxidant and metal salt of a fatty acid, it is recommended to employ the following method: a powdery phenolic antioxidant, a powdery metal salt of a fatty acid and a pelletized low-density polyethylene are added to and mixed with a powdery high-density polyethylene and the mixture is kneaded, or the pellets of a high-density polyethylene containing a phenolic antioxidant and a metal salt of a fatty acid are mixed with a pelletized low-density polyethylene and the mixture is kneaded, because in this way uniform dispersion can be effected and also the additives are allowed to exhibit their effect to the fullest measure.

As the pulp constituting the base paper of the photographic support of this invention, it is advantageous to use a properly selected natural pulp such as disclosed in Japanese Patent Application Kokai Nos. 58-37642, 60-67940, 60-69649 and 61-35442, but there may be used synthetic pulp or synthetic fiber. As natural pulp, it is recommended to use wood pulp such as softwood pulp, hardwood pulp or a mixture of said two types of pulp, which has been subjected to ordinary bleaching with chlorine, hypochlorite or chlorine dioxide, alkali extraction or alkali treatment and if necessary oxidation bleaching with hydrogen peroxide or oxygen, or a combination of such treatments. It is possible to use various types of pulp, such as craft pulp, sulfite pulp, soda pulp, etc.

In manufacture of the photographic support according to this invention, various additives may be contained in the base paper at the time of preparation of a slurry of paper stuff. As sizing agent for instance, a metal salt of a fatty acid and/or a fatty acid, an emulsified alkylketene dimer, an epoxidated higher fatty acid amide, an emulsified alkenyl or alkylsuccinic anhydride, a rosin derivative and the like can be used. Also, there can be used anionic, cationic or ampholytic polyacrylamides, polyvinyl alcohol, cationized starch, vegetable galactomannan, etc., as dry strength agent, polyamine-polyamide epichlorohydrin resin, etc., as wet strength agent, clay, kaolin, calcium carbonate, titanium oxide, etc., as filler, water-soluble aluminum salts such as aluminum chloride, alumina sulfate, etc., as fixing agent, and sodium hydroxide, sodium carbonate, sulfuric acid, etc., as pH modifier such as disclosed in Japanese Patent Application Kokoku No. 62-7534. Color pigments, color dyes and fluorescent bleaching agents such as disclosed in Japanese Patent Application Kokai Nos. 63-204251 and H1-266537 are also usable as said additives. These additives are preferably contained in suitable combination in the base paper.

Further, various types of water-soluble polymers, antistatic agents and other adjuncts may be contained in the base paper by spray or tab size press. As water-soluble polymer, there can be used starch polymers, polyvinyl alcohol based polymers, gelatin polymers, polyacrylamide based polymers, cellulosic polymers, etc. As antistatic agent, there can be used alkali metal salts such as sodium chloride and potassium chloride, alkaline earth metal salts such as calcium chloride and barium chloride, colloidal metal oxides such as colloidal silica, and organic antistatic agents such as polystyrene sulfonates. There can also be used emulsion or latex of ethylene-vinyl acetate copolymer, petroleum resin emulsion, etc., as emulsion or latex, clay, kaolin, talc, barium sulfate, titanium oxide, etc., as pigment, and hydrochloric acid, phosphoric acid, citric acid, sodium hydroxide, etc., as pH modifier such as disclosed in Japanese Patent Application Kokai No. H1-266537. These and other adjuncts such as the above-mentioned color pigments, color dyes and fluorescent bleaching agents may be contained in appropriate combination for maximizing their effect.

As a result of studies by the present inventors, it was found that the object of this invention can be achieved more remarkably when at least that side of the base paper which is opposite from the photographic layer is treated with a copolymer having at least ethylene and acrylic (or methacrylic) acid, as this treatment can synergistically improve adhesion between base paper and back resin layer. As examples of the copolymers having at least ethylene land acrylic (methacrylic) acids, there can be cited those shown in U.S. Pat. No. 4,269,937 and Japanese Patent Application Kokai No. H1-180538.

The base paper used in the present invention is preferably the one having a smooth surface with a Bekk smoothness (defined by JIS P8119) of 100 seconds or above. It is more desirable that the smooth surface of the base paper has a Bekk smoothness of 200 seconds or above. For producing the base paper with a Bekk smoothness of 100 seconds or greater, generally hardwood pulp constituted by short fibers and more suited for producing smooth paper is used in a greater proportion and the mixed pulp is beaten so as to minimize the ratio of long fibers by use of a beater. Specifically, pulp beating is made such that the proportion of the pulp with a fiber length of 42 meshes after beating will be 20–45% and the beaten pulp will have a freeness of 200–350 CSF. Then the stuff slurry added with additives is subjected to paper making operations according to an appropriate paper making method such as described in Japanese Patent Application Kokai Nos. 58-37642 and 61-260240 and GB 2,177,734-A by using an ordinarily employed paper machine such as Fourdrinier paper machine or cylinder paper machine so that uniform formation can be obtained. The resulting web is calendered by a suitable calendering machine such as machine calender, supercalender, hot calender or the like to produce a base paper with a Bekk smoothness of 100 seconds or greater. The thickness of the base paper is not specifically defined in this invention, but preferably the base paper has a basis weight of 40–250 g/m$^2$.

On the front resin layer of the photographic support of this invention, there may be provided an undercoat layer(s) such as described in Japanese Patent Application Kokai Nos. 61-84643, H1-92740 and H1-102551 and U.S. Pat. No. 5,008,150 after activation treatment such as corona discharge treatment, flame treatment, etc. Also, on the back resin layer of the photographic support, various back coat layers may be provided for preventing electrification and for other purposes after activation treatment such as mentioned above. In the back coat layer, there may be contained, in suitable combination, an inorganic antistatic agent, organic antistatic agent, hydrophilic binder, latex, curing agent, pigment, surface active agent and other additives such as disclosed in Japanese Patent Application Kokoku Nos. 57-9059, 57-53940 and 58-56859 and Japanese Patent Application Kokai Nos. 59-214849 and U.S. Pat. Nos. 3,884,692 and 4,547,445.

After various photographic layers are formed by coating, the photographic support of this invention can be applied to various uses such as color photographic paper, monochromic photographic paper, phototypesetting photographic paper, copy photographic paper, reversal photographic material, negative and positive for silver salt dispersion transfer, printing material, etc. The photographic support of this invention may have an emulsion layer containing silver chloride, silver bromide, silver chlorobromide, silver iodobromide, silver chloroiodobromide or the like. The photographic emulsion layer containing a silver halide may contain a color coupler to form a silver halide color photographic layer having a multilayer structure. It is also possible to form a photographic layer for silver salt dispersion transfer. As a binder of these photographic layers, there may be used a hydrophilic polymer such as poly(vinyl pyrrolidone), poly(vinyl alcohol), a sulfuric acid ester of a polysaccharide or the like in addition to an, ordinary gelatin. The photographic layers may contain various additives. For example, there may be contained, in appropriate combination, a sensitizing dye such as a cyanine dye, merocyanine dye, etc., a chemical sensitizer such as a water-soluble gold compound, a sulfur compound, etc., an antifoggant or a stabilizer such as a hydroxytriazolopyrimidine compound, a mercapto-heterocyclic compound, etc., a hardening agent such as formaldehyde, a vinylsulfone compound, an aziridine compound, etc., an auxiliary agent for coating such as a salt of benzenesulfonic acid, sulfosuccinic acid ester, etc., an anticontaminant such as a dialkylhydroquinone compound, etc., and other additives such as fluorescent agent, dye for improving the sharpness, antistatic agent, pH modifier and fogging agent. Also, a water-soluble iridium or rhodium compound may be added at the time of formation and dispersion of a silver halide.

The photographic material provided in accordance with this invention is subjected to treatments such as exposure, development, termination, bleaching, stabilization, etc., as for instance described in "Photosensitive Materials for Photography and Handling Thereof", Photographic Techniques Course Vol. 2, by Goro Miyamoto, published by Kyoritsu Shuppan Co., Ltd., depending on the type of the photographic material. Especially, the multilayer silver halide photographic material which is applied to single-bath bleaching after color development may also be applied to a treatment with a color development solution of any main ingredient such as CD-III, CD-IV (these two compounds are products of Kodak Co., Ltd.), Droxychrom (trade name of a product by May & Mayker Co., Ltd.), etc. The development solution comprising such may ingredient may contain a development accelerator such as benzyl alcohol, thallium salt, phenidone or the like. The photographic material may also be treated with a development solution which contains substantially no benzyl alcohol. A useful one-bath bleaching-fixing solution is a solution of a metal salt of aminopolycarboxylic acid (e.g. a ferric salt of ethylenediaminetetraacetic acid, propylene-diaminetetraacetic acid, etc.). The useful fixing agent is sodium thiosulfate, ammonium thiosulfate and the like. the one-bath bleaching-fixing solution may contain various additives. For example, there may be contained in combination a desilver accelerator (e.g. mercaptocarboxylic acid disclosed in U.S. Pat. No. 3,512,979 and a mercapto-heterocyclic compound disclosed in Belgian Patent No. 682,426), an anti-contaminant, a pH modifier or pH buffer, a hardening agent (e.g. magnesium sulfate, aluminium sulfate and potassium alum), a surface active agent, etc. The one-bath bleaching-fixing solution may be used at various pH values though the useful pH range is 6.0–8.0.

The following Examples further illustrate the invention.

EXAMPLE 1

A 1:1 mixture of hardwood bleached sulfite pulp and hardwood bleached craft pulp was beaten to a Canadian Standard freeness of 320 ml. To 100 parts by weight of this pulp were added 3 parts by weight of cationized starch, 0.2 parts by weight of anionized polyacrylamide, 0.4 parts by weight of alkylketene dimer emulsion (the amount being calculated as ketene dimer) and 0.4 parts by weight of polyamino-polyamide epichlorohydrin resin to make a paper having a basis weight of 160 g/m$^2$. The obtained wet paper was dried at 110° C., impregnated at a rate of 25 g/m$^2$ with a solution composed of 3 parts by weight of carboxy-modified poly(vinyl alcohol), 0.05 parts by weight of a fluorescent bleaching agent, 0.002 parts by weight of a blue dye, 4 parts by weight of sodium chloride, 0.2 parts by weight of citric acid and 93 parts by weight of water, then dried with hot air of 110° C. and calendered under a linear pressure of 90 kg/cm to produce a base paper for a photographic support. This base paper had a Bekk smoothness of 200 seconds.

The side of the base paper (back side) opposite from the side to be coated with the photographic layers was applied to a corona discharge treatment and then subjected to melt extrusion coating with the polyethylene resin compositions shown in Table 1 at a resin temperature of 325° C. and a base paper moving speed of 140 m/min to the coating thicknesses shown in Table 1.

Thereafter, the front side of the base paper was applied to a corona discharge treatment and subjected to melt extrusion coating with a resin composition comprising 20 parts by weight of a masterbatch of a titanium dioxide pigment composed of 47.5% by weight of a low-density polyethylene resin (density: 0.920 g/cm$^3$; MI: 8.5 g/10 min), 50% by weight of an anatase type titanium dioxide pigment surface-treated with hydrous aluminum oxide (0.75% by weight as the amount of $Al_2O_3$ based on titanium dioxide) and 2.5% by weight of zinc stearate, 65 parts by weight of a low-density polyethylene resin (density: 0.920 g/cm$^3$; MI: 4.5 g/10 min) and 15 parts by weight of a high-density polyethylene resin (density: 0.970 g/cm$^3$; MI: 7.0 g/10 min) at a resin temperature of 325° C. and a base paper moving speed of 140 m/min to the coating thicknesses shown in Table 1. Melt extrusion coating with polyethylene resin for the front and back sides of the base paper was conducted according to a so-called tandem coating system in which extrusion coating is performed successively. In the above operation, the surface of the front resin layer containing titanium dioxide pigment of said resin coated paper was worked to a slightly rough surface while the back resin layer was worked to a matte surface like paper.

Further, the surface of the back resin layer of the resin coated paper, after additional corona discharge treatment, was subjected to on-machine coating with a back coating solution comprising a 1:1 mixture of colloidal silica and styrene latex and containing 0.021 g/m$^2$ of sodium polystyrenesulfonate and an appropriate amount of auxiliary agents for coating. The back coating solution was applied to a coating weight of 0.21 g/m$^2$ calculated as latex (on solid weight basis) to obtain a photographic support.

Each of the thus obtained samples of photographic support was kept in a thermo-hygrostat of 50° C. and 60% RH for one day and then evaluated by the methods described below.

Workability of the polyethylene resin compositions in production of the photographic support was evaluated comprehensively by measuring the lateral length of the resin coated portion of the back side to determine the degree of neck-in while examining the degree of formation of ribs and resin gel per area of 10 m$^2$ to see uniformity of the film. Evaluation was made on the following criteria: ○: good; Δ: rather bad but presenting no problem for practical use; X: so bad as posing problem for practical use.

Adhesion between base paper and back resin layer of the photographic support was evaluated by peeling the back side polyethylene layer from the base paper layer of each sample and measuring the areal ratio of the base paper layer adhering to the peeled-off polyethylene layer. Evaluation was made on the following criteria: ○: good, with the areal ratio being 100%; Δ: rather bad but presenting no problem for practical use, with the areal ratio being less than 100% but not lower than 80%; X: so bad as posing problem for practical use, with the areal ratio being less than 80%.

The anticurl properties of the photographic support was evaluated in the following way. First, the surface of the front resin layer containing a titanium dioxide pigment of the photographic support was subjected to a corona discharge treatment and then a blue sensitive emulsion layer containing a yellow color coupler, an intermediate layer containing a color mixing inhibitor, a green sensitive emulsion layer containing a magneta color coupler, an ultraviolet absorbing layer containing an ultra-violet absorber, a red sensitive emulsion layer containing a cyan color coupler and a protective layer were provided on the surface of said front resin layer to prepare a color photographic paper having a total amount of gelatin of 8 g/m$^2$. Each of said emulsion layers contained silver chlorobromide in an amount corresponding to 0.6 g/m$^2$ of silver nitrate and further contained appropriate amounts of antifoggant, sensitizing dye, auxiliary agent for coating, hardening agent, thickener and filter dye. The prepared color photographic paper was kept in an atmosphere of 35° C. and normal humidity for 5 days, and after color development, the state of curling of a 8.2 cm×11.7 cm color print under a condition of 20° C. and 40% RH was examined. Evaluation was made on the following criterion: ○: good anticurl properties - the print had a slight minus curl (curl toward the back coat layer side) or was flat; Δ: the print had a slight plus curl (curl toward the photograph-constituting layers) but it presented no problem for practical use; X: the print had a large plus curl which made the print unsuited for practical use.

The cutting quality of the photographic support was evaluated by cutting said color photographic paper by a precision print cutter to a size of 11.7 cm in length and examining the cut section. Evaluation was made on the following criterion: ○: good cutting quality - there was seen substantially no formation of whisker; Δ: there were formed a few whiskers but they presented no problem for practical use; X: bad cutting quality - there were formed many whiskers, making the print unsuited for practical use.

The obtained results are shown in Table 1.

TABLE 1

| Sample No. *1 | Polyethylene resin composition (parts by wt) HDPE *2 | LDPE *3 | Preparation method of polyethylene resin composition *4 | Thickness of front and back resin layers (μm) Front resin layer | Back resin layer |
|---|---|---|---|---|---|
| 1 | 98 | 2 | Compounding | 30 | 25 |
| 2 | 95 | 5 | " | 30 | 25 |
| 3 | 90 | 10 | " | 30 | 25 |
| 4 | 80 | 20 | " | 30 | 35 |

TABLE 1-continued

| | | | | | |
|---|---|---|---|---|---|
| 5 | 80 | 20 | " | 30 | 30 |
| 6 | 80 | 20 | " | 30 | 27 |
| 7 | 80 | 20 | " | 35 | 25 |
| 8 | 80 | 20 | " | 35 | 35 |
| 9 | 80 | 20 | " | 35 | 28 |
| 10 | 80 | 20 | " | 35 | 22 |
| 11 | 80 | 20 | Simple mixing | 30 | 25 |
| 12 | 75 | 25 | Compounding | 30 | 25 |
| 13 | 65 | 35 | " | 30 | 25 |

| Sample No. *1 | Difference in thickness between front and back resin layers (μm) | Workability of polyethylene resin composition | Adhesion between base paper and resin layer | Anti-curl properties | Cutting quality |
|---|---|---|---|---|---|
| 1 | 5 | X | X | ○ | X |
| 2 | 5 | Δ | Δ | ○ | Δ |
| 3 | 5 | ○ | ○ | ○ | ○ |
| 4 | −5 | ○ | ○ | ○ | X |
| 5 | 0 | ○ | ○ | ○ | X |
| 6 | 3 | ○ | ○ | ○ | Δ |
| 7 | 5 | ○ | ○ | ○ | ○ |
| 8 | 0 | ○ | ○ | ○ | X |
| 9 | 7 | ○ | ○ | ○ | ○ |
| 10 | 12 | ○ | ○ | ○ | ○ |
| 11 | 5 | X | Δ | ○ | Δ |
| 12 | 5 | ○ | Δ | Δ | Δ |
| 13 | 5 | ○ | Δ | X | Δ |

Notes
*1: The encircled numbers indicate the sample Nos. according to the present invention.
*2: a high-density polyethylene resin having a density of 0.960 g/cm³ and MI of 20 g/10 min and containing 200 ppm of Irganox 1010 (a phenolic antioxidant) and 200 ppm of calcium stearate
*3: a low-density polyethylene resin having a density of 0.198 g/cm³ and MI of 1.3 g/10 min.
*4: Compound HDPE and LDPE were melted and mixed a kneading extruder to prepare a compounded resin and this compounded resin was used in the form of pellets.
Simple mixing: HDPE and LDPE were simply mixed and the mixture was supplied to a melt extruder.

It is seen from Table 1 that the photographic supports according to this invention (Sample Nos. 2, 3, 6, 7, 9, 10 and 12), in which the difference in thickness between the front and back resin layers is 3 μm or greater and the polyethylene resin in the back resin layer is a compounded resin prepared beforehand by melting and mixing 5–25 parts by weight of a low-density polyethylene resin and 95–75 parts by weight of a high-density polyethylene resin defined in this invention, are excellent in workability of polyethylene resin composition, adhesion between base paper and resin layers, anticurl properties and cutting qualities. Especially, it is noted that from the synthetic performance of photographic support, it is desirable that the difference in thickness between the front and back resin layers is greater than 3 μm and that the content of HDPE is in the range of 93–77 parts by weight.

It is also seen that the samples falling outside the scope of the present invention have the problems for practical use. For instance, in case the content of high-density polyethylene resin is greater than 95 parts by weight (Sample No. 1), workability of polyethylene resin composition, adhesion between base paper and resin layers and cutting qualities are poor. In case the content of high-density polyethylene resin is less than 75 parts by weight (Sample No. 13), anticurl properties are bad. Also, in case simple mixing is employed for the preparation of polyethylene resin composition (Sample No. 11), workability of polyethylene resin composition is bad and adhesion between base paper and resin layers and cutting qualities tend to be deteriorated. Further, in case the difference in thickness between the front and back resin layers is less than 3 μm (Sample Nos. 4, 5 and 8), cutting qualities are bad.

EXAMPLE 2

The photographic support samples were produced in the same way as Sample No. 7 of Example 1 except that the polyethylene resins for back coating used for Sample No. 7 of Example 1 were replaced by those specified in Table 2. The results are shown in Table 2.

TABLE 2

| *5 | MI of polyethylene resins in resin compositions (*6) (g/10 min) HDPE | LDPE | Workability of polyethylene resin composition | Adhesion between base paper and resin layer | Anti-curl properties | Cutting qualities |
|---|---|---|---|---|---|---|
| | 10 | 1.3 | X | X | ○ | X |
| ○ | 18.5 | 1.3 | Δ | Δ | ○ | Δ |
| ○ | 20 | 1.3 | ○ | ○ | ○ | ○ |
| | 24 | 0.15 | X | Δ | ○ | Δ |
| ○ | 24 | 0.2 | Δ | Δ | ○ | Δ |
| ○ | 24 | 0.3 | ○ | ○ | ○ | ○ |
| ○ | 24 | 0.5 | ○ | ○ | ○ | ○ |
| ○ | 24 | 0.7 | ○ | ○ | ○ | ○ |
| ○ | 24 | 1.0 | ○ | ○ | ○ | ○ |
| ○ | 24 | 1.3 | ○ | ○ | ○ | ○ |
| ○ | 24 | 3 | Δ | ○ | ○ | ○ |
| ○ | 24 | 4 | Δ | ○ | ○ | ○ |
| | 24 | 7 | X | ○ | Δ | ○ |
| ○ | 32 | 0.5 | ○ | ○ | ○ | ○ |
| ○ | 36 | 0.5 | ○ | ○ | ○ | ○ |
| ○ | 36 | 1.3 | ○ | ○ | ○ | ○ |
| ○ | 45 | 0.5 | ○ | ○ | ○ | ○ |
| ○ | 45 | 1.3 | Δ | ○ | ○ | ○ |
| ○ | 50 | 0.5 | Δ | ○ | ○ | ○ |
| ○ | 50 | 1.3 | Δ | ○ | ○ | ○ |
| | 60 | 0.5 | X | ○ | Δ | ○ |
| | 60 | 1.3 | X | ○ | Δ | ○ |

Notes
*5: The circules indicate the samples according to this invention.
*6: resin compositions comprising 80 parts by weight of a high-density polyethylene resin (HDPE) having a density of 0.960 ± 0.002 g/cm³ and 20 parts by weight of a low-density polyethylene resin (LDPE) having a density of 0.920 ± 0.002 g/cm³.

The results of Table 2 show that the useful range of MI of the high-density polyethylene resin used in the present invention is 18.5–50 g/10 min, preferably 18.5–45 g/10 mini more preferably 20–36 g/10 min. It is also noted that the useful range of MI of the low-density polyethylene resin used in this invention is 0.2–4 g/10 min, preferably 0.3–3 g/10 min, more preferably 0.3–1.5 g/10 min.

EXAMPLE 3

The photographic support samples were prepared in the same way as Sample 7 of Example 1 except that the polyethylene resin composition for back coating used in Sample No. 7 of Example 1 was replaced by those shown in Table 3. The obtained results are shown in Table 3.

TABLE 3

| *7 | MI of polyethylene resins in resin compositions (*8) (g/10 min) HDPE | LDPE | Workability of polyethylene resin composition | Adhesion between base paper and resin layer | Anti-curl properties | Cutting qualities |
|---|---|---|---|---|---|---|
| ○ | 0.960 | 0.918 | ○ | ○ | ○ | ○ |
| ○ | 0.960 | 0.927 | ○ | ○ | ○ | ○ |
| ○ | 0.960 | 0.935 | Δ | Δ | ○ | Δ |
| | 0.960 | 0.940 | X | X | ○ | X |
| | 0.945 | 0.918 | ○ | ○ | X | ○ |
| ○ | 0.950 | 0.918 | ○ | ○ | Δ | ○ |
| ○ | 0.955 | 0.918 | ○ | ○ | ○ | ○ |

TABLE 3-continued

| *7 | MI of polyethylene resins in resin compositions (*8) (g/10 min) HDPE | LDPE | Workability of polyethylene resin composition | Adhesion between base paper and resin layer | Anticurl properties | Cutting qualities |
|---|---|---|---|---|---|---|
| ○ | 0.960 | 0.918 | ○ | ○ | ○ | ○ |
| ○ | 0.965 | 0.918 | Δ | Δ | ○ | Δ |

Notes
*7: The circles indicate the samples according to this invention.
*8: resin compositions comprising 80 parts by weight of a high-density polyethylene resin (HDPE) having a MI of 21 ± 1 g/10 min and 20 parts by weight of a low-density polyethylene resin (LDPE) having an MI of 1.3 ± 0.2 g/10 min.

It is seen from Table 3 that the high-density polyethylene resins useful in the present invention are those having a density of 0.950 g/cm$^3$ or above, preferably 0.955 g/cm$^3$ or above, while the low-density polyethylene resins useful in this invention are those having a density of 0.935 g/cm$^3$ or below, preferably 0.930 g/cm$^3$ or below.

EXAMPLE 4

The photographic support samples were obtained in the same way as Sample No. 7 of Example 1 except that the base paper was impregnated with the solutions containing respectively the polymers specified below (polymer A, polymer B and polymer C), in place of the carboxy-modified polyvinyl alcohol, to a polymer coating weight of 1 g/m$^2$ (calculated on solid basis) and that the base paper moving speed during extrusion coating with the resin composition was changed to 190 m/min.

Polymer A: a carboxy-modified polyvinyl alcohol

Polymer B: a 45 wt % aqueous solution of an ethylene-acrylic acid copolymer ionomer (ethylene: 95 mol %; acrylic acid: 5 mol %; metal: $Na^+$; pH: 6.5)

Polymer C: a 45 wt % aqueous solution of an ethylene-acrylic acid copolymer (a copolymer consisting of 90 mol % of ethylene and 10 mol % of acrylic acid and dispersed in an aqueous solution of a copolymer consisting of 40 mol % of N,N-dimethylaminoethyl methacrylate, 50 mol % of butyl methacrylate and 10 mol % of lauryl methacrylate (amount of said cationic copolymer being 5% by weight (calcd. on solid basis) based on the ethylene-acrylic acid copolymer); pH: 4.5; lowest film-forming temperature: 92° C.)

The obtained results are shown in Table 4.

TABLE 4

| Type of polymer | Adhesion between base paper and resin layer | Anticurl properties | Cutting qualities |
|---|---|---|---|
| Polymer A | Δ | ○ | Δ |
| Polymer B | ○ | ○ | ○ |
| Polymer C | ○ | ○ | ○ |

It can be appreciated from Table 4 that the effect of the present invention is produced to the fullest measure when at least the surface of the base paper on the side opposite from the photographic layers is treated with a copolymer having at least ethylene and an acrylic (or methacrylic) acid.

In accordance with the present invention, as described above, there is provided an excellent resin coated paper type photographic support having good adhesion between base paper and resin layer on the side opposite from the photographic layers, excellent in qualities such as anticurl properties and capable of high-speed production.

EXAMPLE 5

In the production of Sample No. 7 of Example 1, no phenolic antioxidant was used. Gel was generated in the film 48 hours after start of extruding.

EXAMPLE 6

In the production of Sample No. 7 of Example 1, a phenolic antioxidant was added in an amount of 600 ppm. Adhesion to paper was rated Δ.

EXAMPLE 7

In the production of Sample No. 7 of Example 1, no calcium stearate was added. Deteriorated resin was generated at the die lip 48 hours after start of molding, and such resin adhered to or caused damage to the film surface.

EXAMPLE 8

In the production of Sample No. 7 of Example 1, calcium stearate was added in an amount of 1,000 ppm. Bleading occurred and contamination of the roll and product surfaces was observed.

What is claimed is:

1. A photographic support comprising a paper substrate and the resin layers formed on both sides thereof, each of said resin layers being made of a resin composition comprising a polyethylene resin, wherein the resin layer on the side on which a photographic layer is to be provided is thicker than the resin layer on the opposite side by 3 μm or greater, and the polyethylene resin in the resin layer on the side opposite from the photographic layer is a compounded resin prepared by melting and mixing 5–25 parts by weight of a low-density or medium-density polyethylene resin having a density of 0.925 g/cm$^3$ or below and a melt index defined by JIS K6760 of 0.2–4 g/10 min and 95–75 parts by weight of a high-density polyethylene resin having a density of 0.950 g/cm$^3$ or more and a melt index defined by JIS K6760 of 18.5–50 g/10 min.

2. A photographic support according to claim 1, wherein at least the surface of the base paper on the side opposite from the photographic layer is treated with a copolymer comprising ethylene and one of acrylic and methacrylic acid.

3. A photographic support according to claim 1, wherein a phenolic antioxidant is contained in an amount of 50–500 ppm based on the total amount of the high-density polyethylene and the low-density or medium-density polyethylene.

4. A photographic support according to claim 1, wherein a metal salt of a fatty acid is contained in an amount of 50–800 ppm based on the total amount of the high-density polyethylene and the low-density or medium-density polyethylene.

5. A photographic support according to claim 1, wherein a phenolic antioxidant is contained in an amount of 50–500 ppm and a metal salt of a fatty acid in an amount of 50–800 ppm based on the total amount of the high-density polyethylene and the low-density or medium-density polyethylene.

6. A photographic support according to claim 1, wherein the resin composition has been prepared by mixing a powdery phenolic antioxidant, a powdery metal salt of a fatty acid and a pelletized low-density polyethylene with a powdery high-density polyethylene and kneading the mixture.

7. A photographic support according to claim 1, wherein the resin composition has been prepared by mixing a pelletized high-density polyethylene containing a phenolic antioxidant and/or a metal salt of a fatty acid, and a pelletized low-density polyethylene, and then kneading the mixture.

* * * * *